United States Patent [19]
Suzuki

[11] Patent Number: 5,903,300
[45] Date of Patent: May 11, 1999

[54] DEFLECTION SCANNING APPARATUS HAVING BALANCE CONTROL

[75] Inventor: Yasuo Suzuki, Tokyo, Japan

[73] Assignee: Canon Kabushiki Kaisha, Tokyo, Japan

[21] Appl. No.: 08/968,583

[22] Filed: Nov. 13, 1997

Related U.S. Application Data

[62] Division of application No. 08/946,571, Oct. 7, 1997, which is a continuation of application No. 08/711,458, Sep. 6, 1996, abandoned, which is a continuation of application No. 08/175,576, Dec. 30, 1993, abandoned.

[30] Foreign Application Priority Data

Jan. 12, 1993 [JP] Japan ............................ 5-3448
Jan. 13, 1993 [JP] Japan ............................ 5-4209

[51] Int. Cl.⁶ ...................................... B41J 2/47
[52] U.S. Cl. ............................ 347/261; 359/855
[58] Field of Search .................... 347/256, 257, 347/259, 260, 261, 241; 359/200, 216, 223, 855, 882

[56] References Cited

U.S. PATENT DOCUMENTS

| 4,421,385 | 12/1983 | Yamaguichi | 350/299 |
| 5,245,463 | 9/1993 | Goto | 359/224 |

FOREIGN PATENT DOCUMENTS

| 3 129 502 | 5/1982 | Germany. |
| 62-177334 | 8/1987 | Japan. |
| 2 189 510 | 7/1990 | Japan. |

*Primary Examiner*—Mark J. Reinhart
*Attorney, Agent, or Firm*—Fitzpatrick, Cella, Harper & Scinto

[57] ABSTRACT

In a deflection scanning apparatus used for a laser beam printer or the like, a rotating body is provided with a deflector which has a plurality of recesses arranged in a concentric manner with the center at the rotation axis of the rotating body. Balance weights are set in the recesses so as to remove rotation unbalance in rotation of the rotating body.

21 Claims, 9 Drawing Sheets

DEFLECTION SCANNING APPARATUS HAVING BALANCE CONTROL

This application is a continuation of application Ser. No. 08/946,571, filed Oct. 7, 1997, which is a continuation of application Ser. No. 08/711,458, filed Sep. 6, 1996, now abandoned, which is a continuation of application Ser. No. 08/175,576, filed Dec. 30, 1993, now abandoned.

BACKGROUND OF THE INVENTION

Field of the Invention

The present invention relates to a deflection scanning apparatus used in a laser beam printer or the like, and more particularly to a deflection scanning apparatus which can prevent noise generation or performance degradation due to vibration during rotation of a rotary polygon mirror therein.

Related Background Art

Laser beam printers and laser facsimile machines employ a deflection scanning apparatus, in which a photosensitive drum is scanned with a beam deflected and scanned by a deflector to form an electrostatic latent image thereon. This electrostatic latent image is visualized as a toner image by a developing device and the toner image is transferred onto a record sheet. Subsequently, the record sheet with the transferred toner image is guided through a fixing device to heat-fix the toner on the sheet to complete printing.

FIG. 1 is a plan view to illustrate the structure of a deflection scanning apparatus used in a laser beam printer for scanning a photosensitive member with a beam.

A deflection scanning apparatus 151 is enclosed in a housing 152. FIG. 1 is a plan view of the apparatus in housing 152, a cover of which is removed. The scanning optical apparatus 151 is constituted by a light source 153 including a semiconductor laser device and a collimator lens system, a cylindrical lens 154 for condensing light emitted from the light source 153 into a linear beam, a rotary polygon mirror 155 having a deflection-reflecting surface 155a in the vicinity of a linear image of the beam condensed by the cylindrical lens 154, and an fθ lens 156. The deflection-reflecting surface 155a deflects or reflects the beam. The thus deflected or reflected beam passes through the fθ lens 156 then to impinge on a reflecting mirror 157. The reflecting mirror 157 reflects the beam so that it irradiates a photosensitive drum 158 which is a recording medium.

The rotary polygon mirror 155 has a cross section of a regular hexagon perpendicular to the axis and uniform in the axial direction and has side faces of a reflecting mirror, which constitute the deflection-reflecting surface 155a. The rotary polygon mirror 155 is driven by a motor 159 to rotate at constant speed in the direction of arrow 171 about the axis. The rotation changes with time an angle between an optical path of the beam generated from the light source 153 and then passing through the cylindrical lens 154 and the normal line to the deflection-reflecting surface 155a, which is an incident angle of beam into the deflection-reflecting surface 155a. Since an angle of reflection changes with the change of the incident angle, the beam forms a spot on the photosensitive drum 158, moving in the direction of arrow 160 in FIG. 1.

The fθ lens 156 is so designed that the beam reflected on the deflection-reflecting surface 155a is focused to form a spot on the photosensitive drum 158 and that the scanning speed of spot is kept uniform in the direction of arrow 160.

To obtain such characteristics of fθ lens 156, the fθ lens 156 is composed of two lens systems, which are a first fθ lens element 161 and a second fθ lens element 162.

The rotation of rotary polygon mirror 155 in the direction of arrow 171 effects the main scan of beam on the photosensitive drum 158, while the sub-scan is carried out by rotating the photosensitive drum 158 around the axis thereof. An electrostatic latent image is thus formed on the surface of photosensitive drum 158.

Arranged around the photosensitive drum 158 are a corona discharger for uniformly charging the surface of photosensitive drum 158, a developing device for developing the electrostatic latent image formed on the surface of photosensitive drum 158 to form a visual toner image, and a transfer corona discharger for transferring the toner image onto a recording sheet, which are not shown. They work to print the record information according to the beam emitted from the light source 153 on the recording sheet.

A reflecting mirror 173 is provided between the first fθ lens element 161 in fθ lens 156 and the deflection-reflecting surface 155a of rotary polygon mirror 155 and on an optical path L2 in which a beam passes on a more upstream side in the direction of arrow 160 in FIG. 1 than an optical path L1 of a beam reaching a write start position 172 of record information on the surface of photosensitive drum 158. The beam reflected by the reflecting mirror 173 is guided through a condenser lens 174 onto a light receiving surface 175a of light receiving element 175 arranged to include, for example, a photodiode. When the condenser lens 174 focuses the beam deflected and scanned by the rotary polygon mirror 155 such that the beam irradiates the light receiving surface 175a, the light receiving element 175 outputs a signal for detecting a position where the beam is scanned.

The condenser lens 174 and the light receiving element 175 are disposed between the first fθ lens element 161 in fθ lens 156 and the rotary polygon mirror 155, so that an optical path L3 between the reflecting mirror 173 and the condenser lens 174 is located between the first fθ lens element 161 and the rotary polygon mirror 155.

The light source 153 emits a beam in accordance with a signal given from a processing circuit 181 for processing information from a host computer. The signal given to the light source 153 corresponds to information to be written on the photosensitive drum 158, and therefore an electrostatic latent image corresponding to the desired information is formed thereby on the photosensitive drum 158. The processing circuit 181 supplies to the light source 153 a unit of signal representing information corresponding to a scanning line which is a locus of the spot formed by the beam on the surface of photosensitive drum 158. The signal is output in synchronism with the signal given from the light receiving element 175 through a line 176.

A motor 159 is mounted on the bottom of housing 152 and the rotary polygon mirror 155 is attached to a drive shaft 159b of the motor 159. The fθ lens 156 is also mounted on the bottom of housing 152, and the light receiving means arranged to include the reflecting mirror 173, the condenser lens 174 and the light receiving element 175 as described above is set between the rotary polygon mirror 155 and the fθ lens 156.

A conventional deflection scanning apparatus of this type includes a rotary polygon mirror and its driving portion, as shown in FIG. 2, which comprise a base 102 set in a box 101 similar to the above-described housing 152, bearings 103 supported in the base 102, and a shaft 104 rotatably supported by the bearings 103 and in which a drive motor $M_0$ is constituted by a rotor 106 fixed to a flange 105 incorporated with the shaft 104, and a stator 107 fixed to the base 102.

The rotary polygon mirror 108 is urged against the flange 105 by a keep plate 109 screwed on the upper end of shaft 104, a clamping washer 113 and a tension plate 112, as shown in FIG. 2, whereby the rotary polygon mirror 118 is united with the rotor 106 so as to rotate with the shaft 104. The upper opening of box 101 in FIG. 2 is closed by a cover 110.

A light source (not shown), similar to the above-described light source 153, emits a laser beam irradiating the rotary polygon mirror 108 and the laser beam is deflected and scanned with rotation of rotary polygon mirror 108 to advance toward a photosensitive drum (not shown) similar to the above-described photosensitive drum 158. The rotor 106 is provided with a recess 111 for relieving dynamic unbalance caused on the shaft 104 during rotation of the rotary polygon mirror 108. The recess 111 is formed by cutting a part of the surface of rotor 106 before assembling.

The above conventional technology, however, only relieves the dynamic unbalance during rotation of the rotor by removing a part of the rotor before assembling it, and therefore cannot relieve dynamic unbalance arisen from assembly errors in mounting of the rotary polygon mirror or dynamic unbalance caused by unevenness in thickness of members other than the rotor, incorporated with the shaft and rotating therewith, for example, the rotary polygon mirror or the keep plate for keeping the polygon mirror mounted on the shaft.

In more detail, only relieving the dynamic unbalance of the rotor cannot fully reduce the dynamic unbalance caused by the unevenness of thickness, in the direction of rotational axis, of the whole rotating body including the shaft and all members united therewith, which causes vibration of the rotary polygon mirror in rotation at high speed, resulting in noises and degrading the performance greatly.

SUMMARY OF THE INVENTION

The present invention permits more precise and speedier balance adjustment, for example, by setting and adhering a plurality of balance weights different in specific gravity into a recess on a rotary polygon mirror.

Specifically, a deflection scanning apparatus comprises a rotation shaft rotatably supported by bearings fixed on a base, a rotor fixed to the shaft, a rotary polygon mirror incorporated with the rotor through elastic press means, and a stator fixed to the base, which is driven to rotate by a motor composed of the shaft, the rotor and the stator, in which at least one member out of the rotor, the elastic press means and the rotary polygon mirror has a concentric recess portion with the center on the center of the rotation shaft and in which a plurality of balance weights different in specific gravity are set in the recess portion to remove rotation unbalance during rotation.

Employing the above arrangement according to the present invention, materials different in specific gravity may be used as the balance weights for relieving the dynamic unbalance of the entire rotating body including the rotary polygon mirror such that a small amount of heavier material is used for first adjustment and another lighter material for second adjustment, whereby more precise balance correction can be made.

Also, the present invention permits more precise and speedier balance adjustment, for example, by providing a plurality of recesses for setting of balance weights on a rotary polygon mirror.

Specifically, a deflection scanning apparatus comprises a rotation shaft rotatably supported by bearings fixed on a base, a rotor fixed to the shaft, a rotary polygon mirror incorporated with the rotor through elastic press means, and a stator fixed to the base, which is driven to rotate by a motor composed of the shaft, the rotor and the stator, in which at least one member out of the rotor, the elastic press means and the rotary polygon mirror is provided with a plurality of concentric recesses with the center on the center of rotation shaft and in which a plurality of balance weights are set in the recesses to remove rotation unbalance during rotation.

BRIEF DESCRIPTION OF THE DRAWINGS

FIG. 10 is a drawing to illustrate the arrangement near the rotary polygon mirror.

DETAILED DESCRIPTION OF THE PREFERRED EMBODIMENTS

Figure 3:
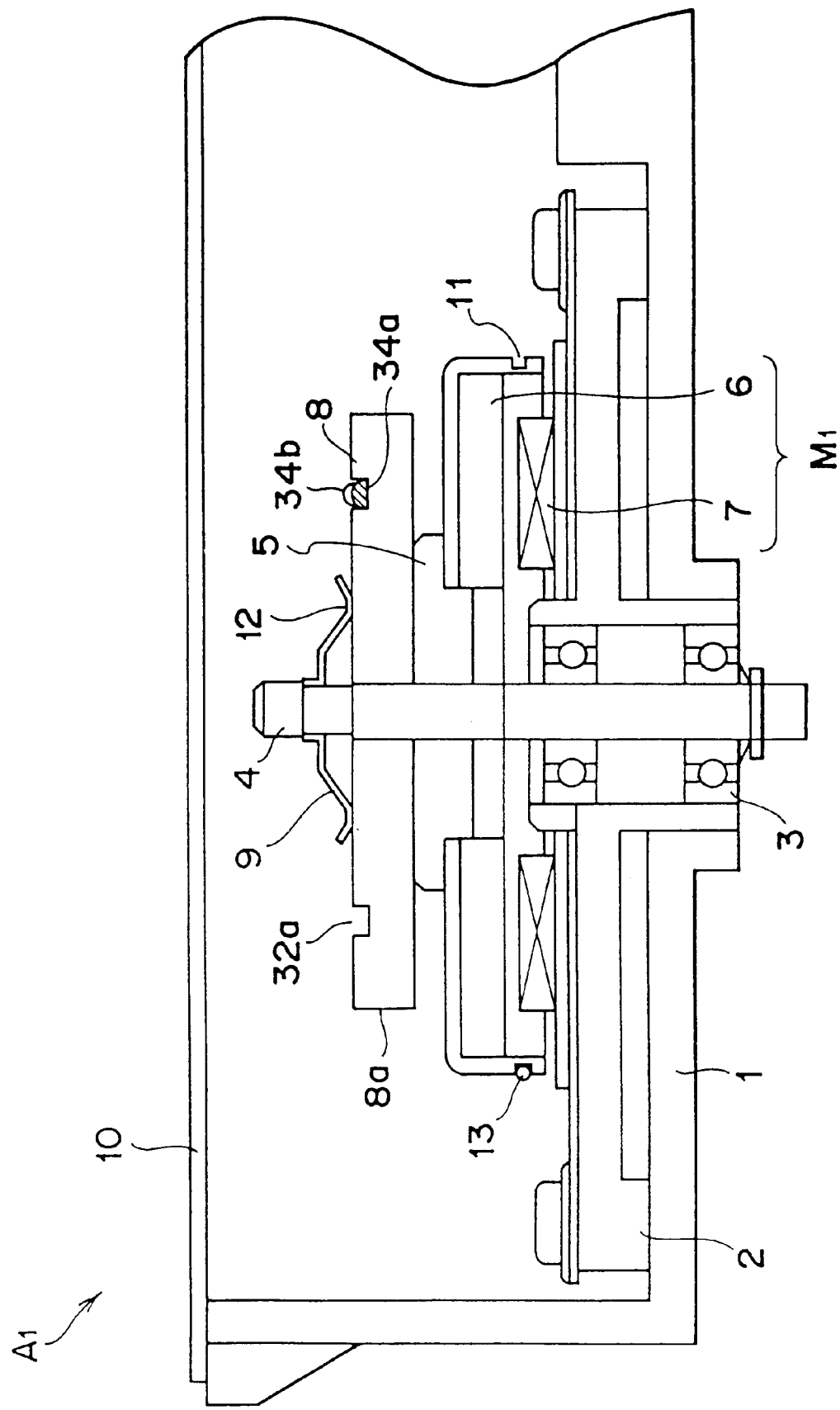
FIG. 3 is a drawing to illustrate the structure of a first embodiment of deflection scanning apparatus according to the present invention.

FIG. 3 is a partial cross section to show a part of the first embodiment of a deflection scanning apparatus according to the present invention. A deflection scanning apparatus $A_1$ of the present embodiment has a base 2 set in a box 1, bearings 3 supported in the base 2, and a rotation shaft 4 rotatably supported by the bearings 3. A drive motor $M_1$ is constituted by a rotor 6 fixed on a flange 5 incorporated with the shaft 4, and a stator 7 fixed on the base 2. A rotary polygon mirror 8 is urged against the flange 5 by a tension plate 9 which is elastic press means fit on the shaft 4 near the upper end thereof in FIG. 3, whereby the polygon mirror 8 is incorporated with the rotor 6.

As described, the shaft 4, the flange 5, the rotor 6, the rotary polygon mirror 8 and the tension plate 9 are assembled in a united manner to constitute a rotating body which is rotated by a drive of motor $M_1$. A cover 10 closes the upper opening of box 1 at the upper edge as shown. The overall construction of the deflection scanning apparatus $A_1$ is substantially the same as that of the apparatus as described above with FIG. 1, and therefore is omitted to explain herein.

The tension plate 9 has an annular recess 12 for setting of balance weight, which is a concentric recess with the center on the center of rotation shaft 4.

The rotor 6 has an annular groove 11 for setting of balance weight, which is formed by cutting a part of the circumferential wall thereof and which is a concentric recess with the center on the center of rotation shaft 4. In addition, an annular groove 32a for setting of balance weight is formed on the surface of rotary polygon mirror 8 as a concentric recess with the center on the center of rotation shaft 4.

As described above, the deflection scanning apparatus of the present invention is so arranged that a balance weight or balance weights are set in the recesses for setting of balance weight on the rotor and the rotary polygon mirror as separated in the direction of rotation shaft of the rotating body, so as to relieve the dynamic unbalance of the entire rotating body including the rotary polygon mirror.

The annular groove 11, the annular groove 32a and the annular recess 12 are provided for setting balance weights 13, 34a, 34b therein. The setting is carried out as follows.

As the motor $M_1$ drives to rotate the rotating body of the rotor 6, the flange 5, the rotary polygon mirror 8 and the tension plate 9 incorporated on the shaft 4, the dynamic unbalance is measured on the rotating body. Then balance-weight setting positions to cancel the measured dynamic unbalance are selected in the annular groove 11, the annular groove 32a and the annular recess 12. A necessary amount of each balance weight is calculated and each balance weight 13, 34a, 34b is set based on the calculated amount. Each balance weight 13, 34a, 34b can be set at an arbitrary position in the annular groove 11, the annular groove 32a or the annular recess 12. Further, since the annular groove 11, the annular groove 32a and the annular recess 12 are arranged at positions apart from each other in the radial direction of the shaft 4, by properly setting a ratio and relative circumferential positions of the balance weights 13, 34a, 34b to be set in the grooves, the aforementioned dynamic unbalance can be greatly relieved without causing great unbalance in the direction of center axis of shaft 4.

Consequently, vibration upon rotation of the rotary polygon mirror 8 can be greatly reduced while suppressing the noise and keeping the performance of the deflection scanning apparatus $A_1$ unaffected. As for the dynamic unbalance of the rotor itself due to unbalance of mass thereof, it should be preferably canceled by conventional procedure before the rotor 6 is set on the shaft 4. If a material mainly containing an uncured adhesive is used to be the balance weights 13, 34a, 34b, adjustment of the applied amount and the setting would be easy. Further, if such a material includes particles of solid material, such as glass beads, powders of ceramic or metal to adjust its specific gravity, a use amount of adhesive can be reduced.

In addition, if the adhesive is an ultraviolet-curing adhesive, it can be cured in a short time after the balance weights are set, thereby shortening the time necessary for production of the deflection scanning apparatus.

A high-speed rotary motor requires more precise cancellation of dynamic unbalance. For the rotor 6, the annular groove 11 can be made deeper and additional balance weight 13 can be dropped at the same position to adhere thereto. However, if in the rotary polygon mirror 8 the annular groove 32a is made deeper, the profile irregularity of deflection-reflecting surface 8a of rotary polygon mirror 8 is degraded, resulting in causing face inclination or irregularity of beam size. Also, it was found that in case a balance weight with as high a specific gravity as possible was used, it was very difficult upon the second drop to surely eject an amount of less than 1 mg.

The deflection scanning apparatus of the present invention is thus so arranged that a plurality of balance weights with different specific gravities are set to remove the rotation unbalance in rotation.

For example, the balance weights 13, 34a for first application are an ultraviolet-curing adhesive with a large specific gravity of at least about 2, while the balance weight 34b for second application is an ultraviolet-curing adhesive with a small specific gravity of about 1.

The specific gravity can be readily controlled by adjusting an amount of beads or powders of solid material such as ceramic or metal, contained in the adhesive.

Figure 4:
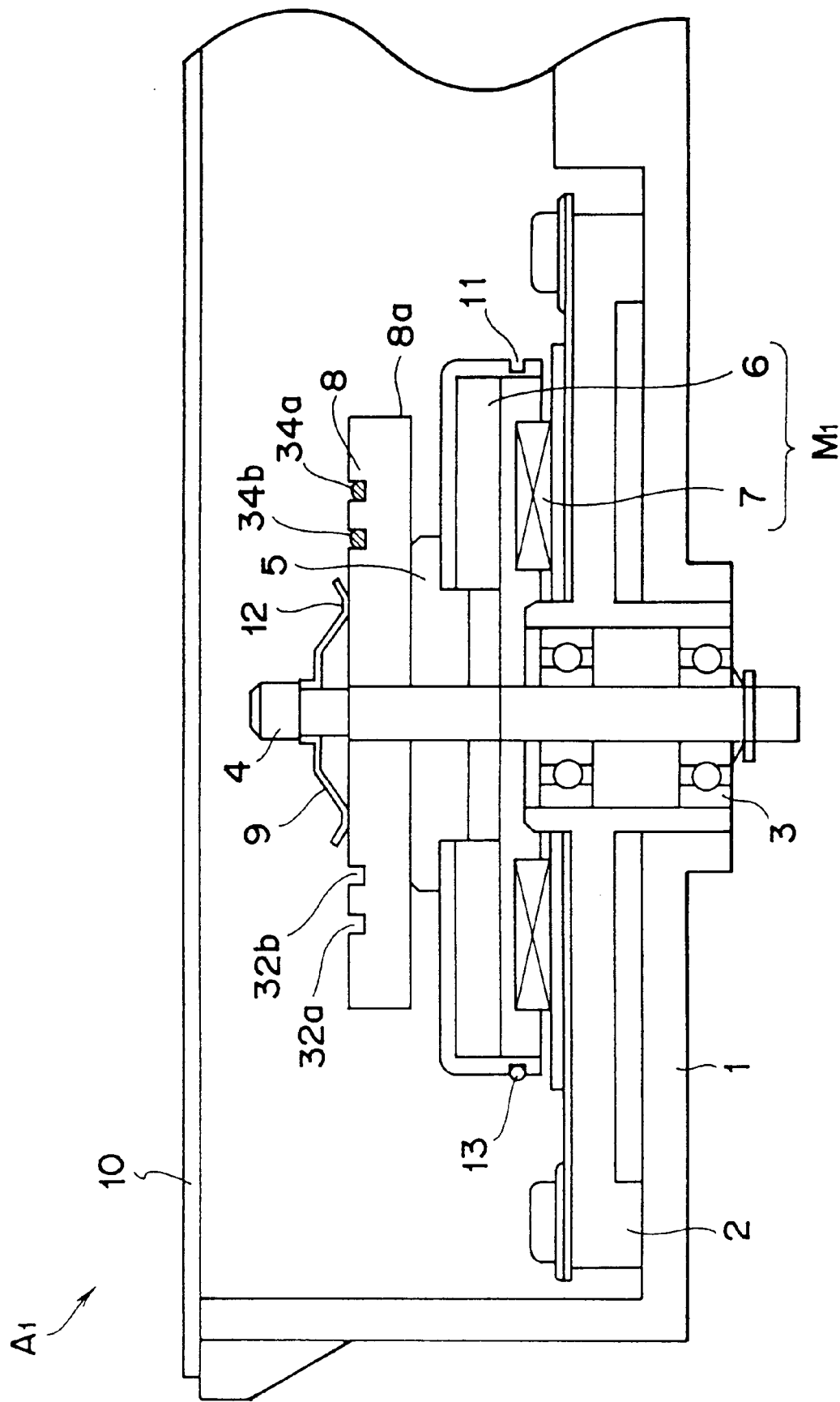
FIG. 4 is a drawing to illustrate the structure of a modification of the embodiment of the deflection scanning apparatus according to the present invention.

FIG. 4 illustrates a modification of the first embodiment of the deflection scanning apparatus according to the present invention. This modification is so arranged that the rotary polygon mirror 8 has a further annular groove 32b for second adjustment and that a balance weight 34b with a smaller specific gravity than that of the balance weight 34a for first adjustment on the rotary polygon mirror 8 is dropped at a certain position in the annular groove 32b to adhere thereto.

The rotor 6 has an annular groove 11 for setting of a balance weight, which is a concentric recess with the center on the center of rotation shaft 4 and which is formed by cutting a part of the circumferential wall thereof. Also, annular grooves 32a, 32b for setting of balance weights are provided on the surface of rotary polygon Mirror 8 as concentric recesses with the center on the center of rotation shaft 4.

The annular groove 11, the annular grooves 32a, 32b and the annular recess 12 are provided for setting balance weights 13, 34a, 34b therein. The setting is carried out as follows.

As the motor $M_1$ drives to rotate the rotating body of the rotor 6, the flange 5, the rotary polygon mirror 8 and the tension plate 9 incorporated on the shaft 4, the dynamic unbalance is measured on the rotating body. Then balance-weight setting positions to cancel the measured dynamic unbalance are selected in the annular groove 11, the annular grooves 32a, 32b and the annular recess 12. A necessary amount of each balance weight is calculated and each balance weight 13, 34a, 34b is set based on the calculated amount. Each balance weight 13, 34a, 34b can be set at an arbitrary position in the annular groove 11, the annular groove 32a, 32b or the annular recess 12. Further, since the annular groove 11, the annular grooves 32a, 32b and the annular recess 12 are arranged at positions apart from each other in the radial direction of the shaft 4, by properly setting a ratio and relative circumferential positions of the balance weights 13, 34a, 34b to be set in the grooves, the aforementioned dynamic unbalance can be greatly relieved without causing great unbalance in the direction of center axis of shaft 4.

Consequently, vibration upon rotation of the rotary polygon mirror 8 can be greatly reduced while suppressing the noise and keeping the performance of the deflection scanning apparatus $A_1$ unaffected. As for the dynamic unbalance of the rotor itself due to unbalance of mass thereof, it should be preferably canceled by conventional procedure before the rotor 6 is set on the shaft 4. If a material mainly containing an uncured adhesive is used to be the balance weights 13, 34a, 34b, adjustment of applied amount and the setting would be easy. Further, if such a material includes particles of solid material, such as glass, beads, powders of ceramic or metal to adjust its specific gravity, a use amount of adhesive can be reduced.

In addition, if the adhesive is an ultraviolet-curing adhesive, it can be cured in a short time after the balance weights are set, thereby shortening the time necessary for production of the deflection scanning apparatus.

A high-speed rotary motor requires more precise cancellation of dynamic unbalance. For the rotor 6, the annular groove 11 can be made deeper and additional balance weight 13 can be dropped at the same position to adhere thereto. However, if in the rotary polygon mirror 8 the annular groove 32a is made deeper, the profile irregularity of deflection-reflecting surface 8a of rotary polygon mirror 8 is degraded, resulting in causing face inclination or irregularity of beam size.

Therefore, the deflection scanning apparatus of the present invention has the relatively shallow annular grooves 32a, 32b for balance weight on the surface of rotary polygon mirror 8, so that in first balance adjustment the balance weight 34a is dropped into the annular groove 32a to adhere thereto and in second balance adjustment the balance weight 34b is dropped into the annular groove 32b to adhere thereto.

Figure 5:
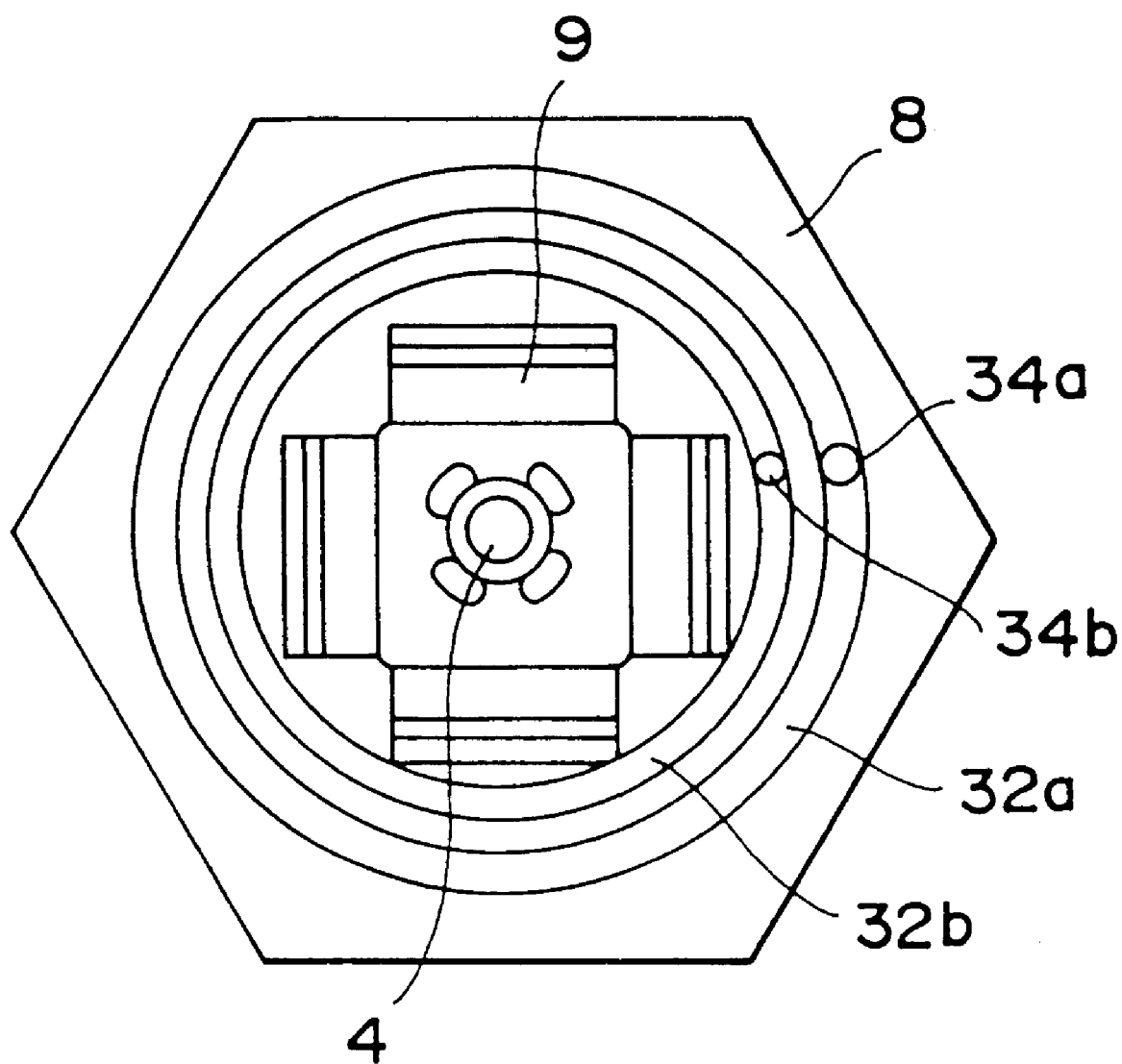
FIG. 5 is a drawing to illustrate the arrangement near the rotary polygon mirror.

As shown in FIG. 5, provided on the surface of rotary polygon mirror 8 are the annular grooves 32a, 32b for setting of balance weight, which are the concentric recesses with the center on the center of rotation shaft 4.

Since the annular grooves 32a, 32b are arranged at positions apart from each other in the radial direction of the shaft 4, by properly setting different specific gravities of balance weights 34a, 34b to be set in the grooves, the aforementioned dynamic unbalance can be greatly relieved without causing great unbalance in the direction of center axis of the shaft 4.

Figure 1:
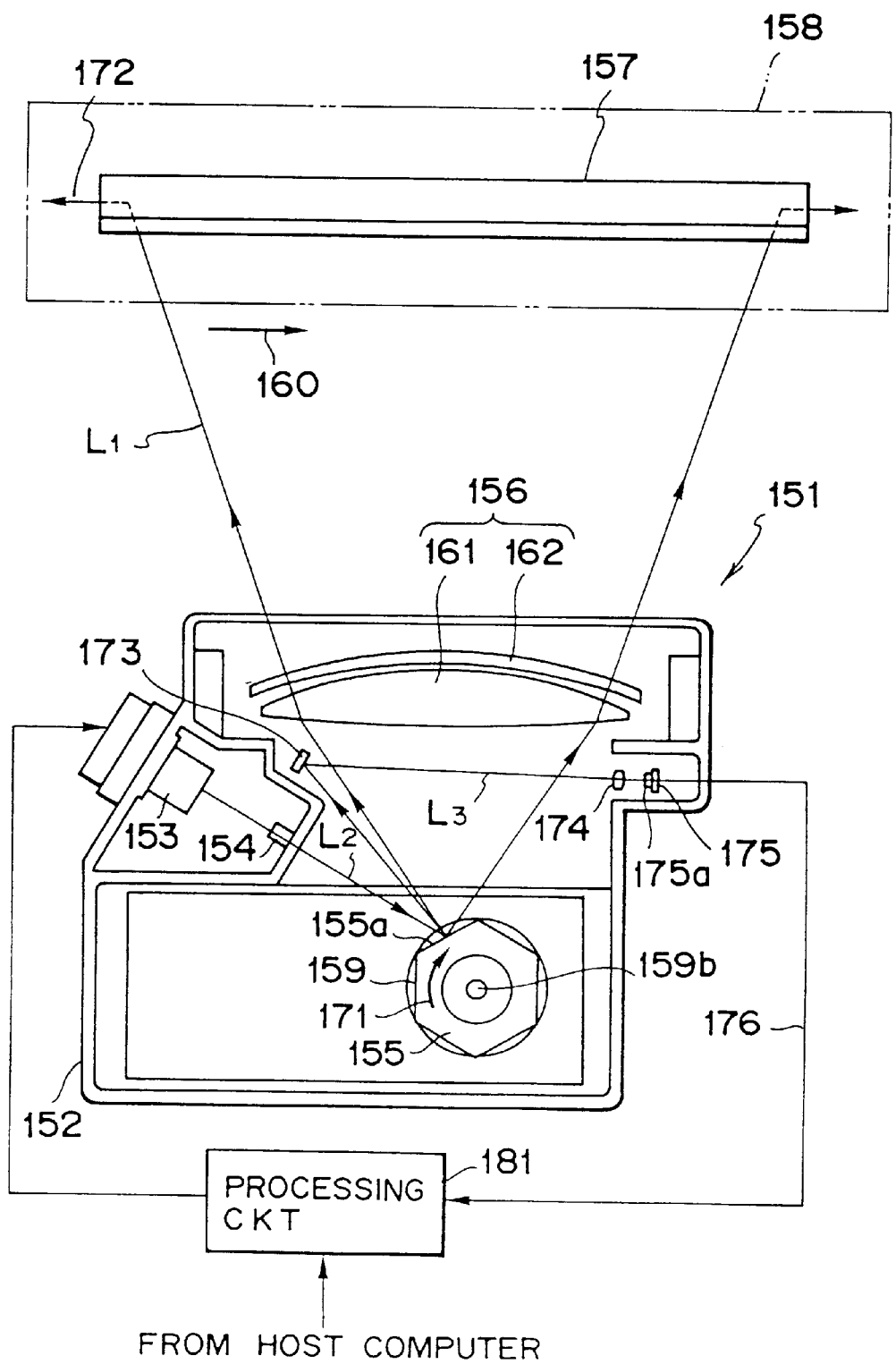
FIG. 1 is a drawing to illustrate the structure of a conventional deflection scanning apparatus.

The overall construction of the deflection scanning apparatus $A_1$ is substantially the same as that of the apparatus described with FIG. 1, and therefore a detailed explanation is omitted.

Figure 6:
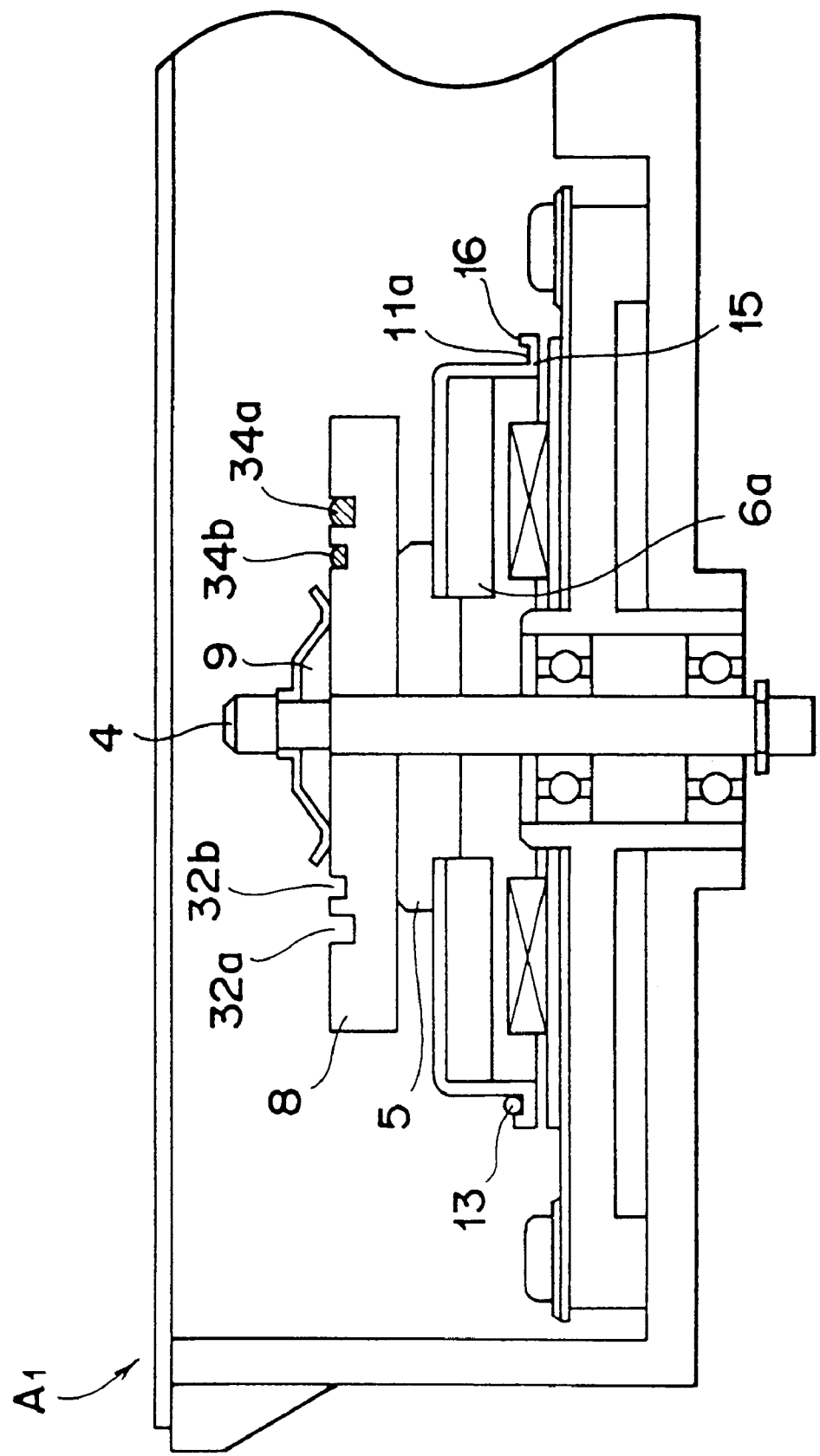
FIG. 6 is a drawing to illustrate the structure of a modification of the embodiment of deflection scanning apparatus according to the present invention.

FIG. 6 illustrates a modification of the second embodiment of the deflection scanning apparatus according to the present invention. The present embodiment is so arranged as to use a concentric annular recess 11a with the center on the center of rotation shaft 4 in place of the annular groove 11, which is constituted by a rotor flange 15 integral with the peripheral edge of rotor 6a and an annular projection 16 projecting upward in FIG. 6 and integral with the peripheral edge.

Since in the present modification the annular recess 11a opens upward as shown in the same manner as the annular grooves 32a, 32b on the rotary polygon mirror 8, it is convenient for the setting operation of the balance weights 34a, 34b with different specific gravities mainly containing an uncured adhesive. In addition, when the adhesive is cured by irradiation of ultraviolet rays, an amount is less in movement of the equipment used for ultraviolet irradiation, because the ultraviolet rays can be applied in the same direction.

Figure 7:
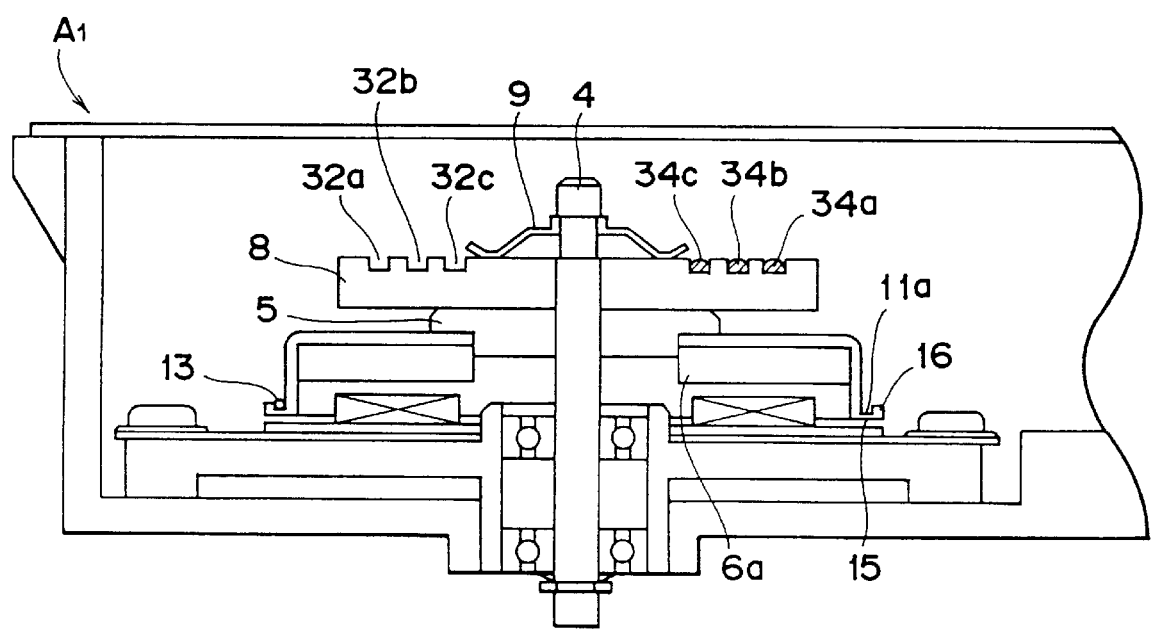
FIG. 7 is a drawing to illustrate the structure of a modification of the embodiment of deflection scanning apparatus according to the present invention.

Although the present embodiment describes the two grooves 32a, 32b as a plurality of annular grooves on the rotary polygon mirror 8, it can be contemplated that three grooves 32a, 32b, 32c are provided as shown in FIG. 7 for the case that the adjustment is not completed by the first and second balance corrections with the balance weights 34a, 34b.

In this case, three types of ultraviolet-curing adhesives with different specific gravities are used as balance weights 34a, 34b, 34c.

The overall construction of the deflection scanning apparatus $A_1$ is substantially the same as that of the apparatus described with FIG. 1, and therefore is omitted to explain herein.

Figure 8:
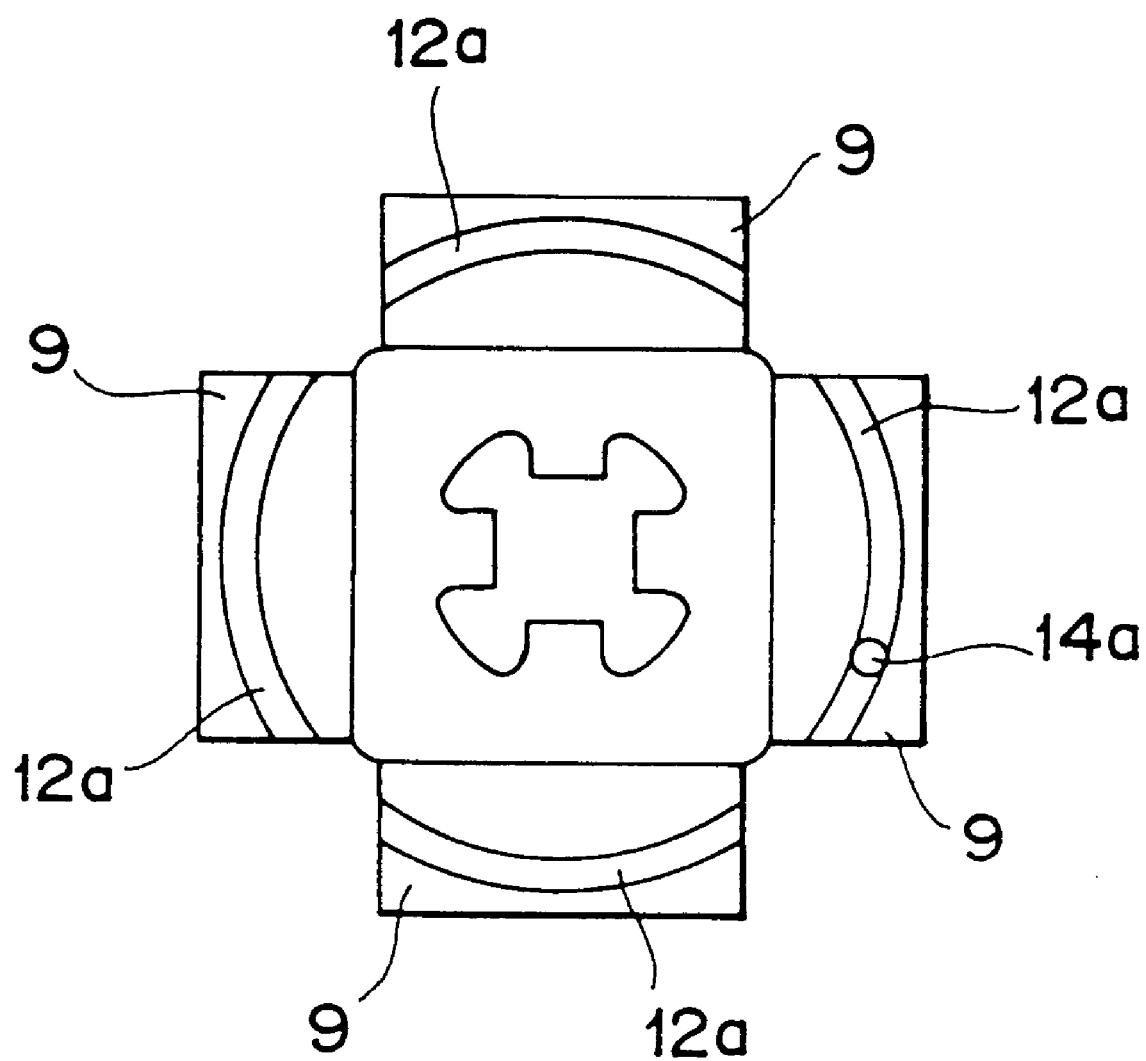
FIG. 8 is a drawing to illustrate the arrangement near the rotary polygon mirror.
Figure 9:
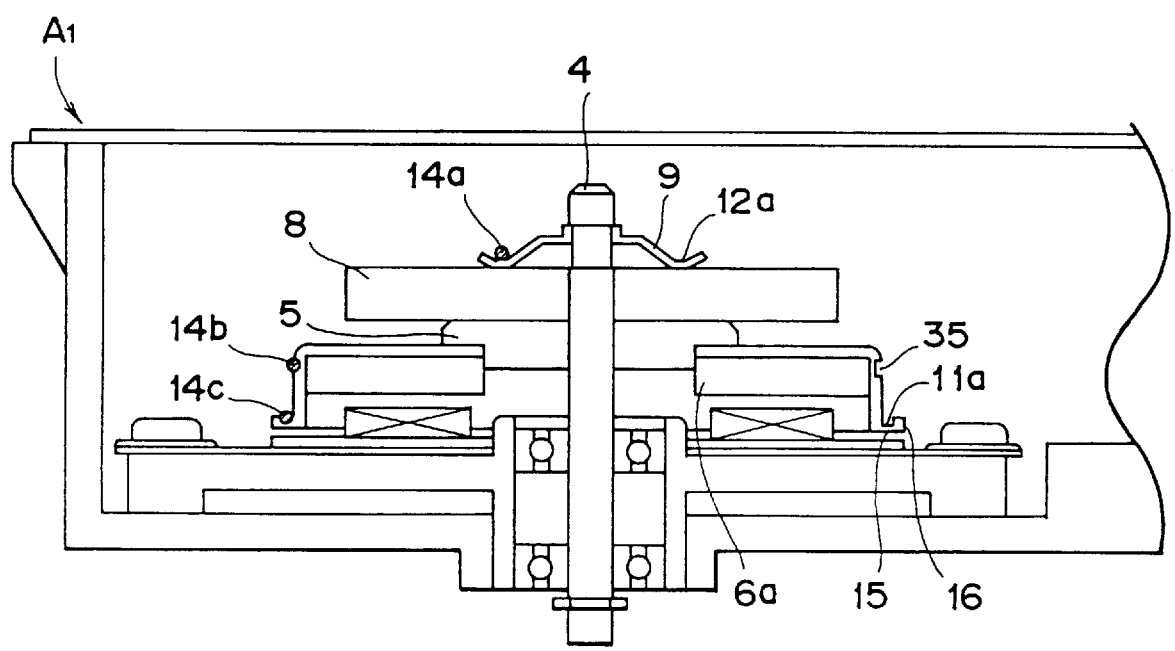
FIG. 9 is a drawing to illustrate the structure of a modification of the embodiment of deflection scanning apparatus according to the present invention.

FIG. 8 and FIG. 9 are drawings to illustrate another modification of the first embodiment of deflection scanning apparatus according to the present invention. The present modification is so arranged that the tension plate 9 for urging the rotary polygon mirror 8 against the flange 5 to fix it is provided with arcuate recesses 12a concentrically arranged with the center on the center of rotation shaft 4, that the rotor flange 15 forms, together with the annular projection 16, a concentric annular recess 11a with the center on the center of rotation shaft 4, and further that the rotor flange 15 has a concentric annular groove 35 with the center on the center of rotation shaft 4.

In this case, three types of ultraviolet-curing adhesives with different specific gravities are used as balance weights 14a, 14b, 14c for balance correction.

The overall construction of the deflection scanning apparatus $A_1$ is substantially the same as that of the apparatus described with FIG. 1, and therefore a detailed explanation is omitted.

FIG. 10 is a drawing to illustrate another modification of the first embodiment of deflection scanning apparatus according to the present invention. The present modification is so arranged that the rotary polygon mirror 8 has annular grooves 32a, 32b which are concentric recesses with the center on the center of rotation shaft 4 and that the tension plate 9 for urging the rotary polygon mirror 8 against the flange 5 (not shown) has arcuate recesses 12a concentrically arranged with the center on the center of rotation shaft 4.

In this case, three types of ultraviolet-curing adhesives with different specific gravities are used as balance weights 34a, 34b, 34c for balance correction.

As seen from the above embodiments, more precise balance correction can be made by providing a groove for each of the balance weights different in specific gravity.

Although the above embodiments showed examples in which a plurality of balance weight grooves were provided only on either one of the rotary polygon mirror and the rotor flange, the both members for balance correction each may have a plurality of balance weight grooves to further enhance the effect thereby.

The plural balance weight grooves in the present invention do not have to be limited to those given on either the rotary polygon mirror, the tension plate or the rotor, as shown in the above embodiments, but may be provided on any member which rotates together with the rotary polygon mirror.

Although the above embodiments show examples in which the ultraviolet-curing adhesives were used as balance weights with different specific gravities, clay-like adhesives with different specific gravities may be also employed as the balance weights.

As described above, the present invention is characterized in that materials different in specific gravity are used as balance weights for relieving the dynamic unbalance of the overall rotating body including the rotary polygon mirror and in that the plurality of balance weights different in specific gravity are made to adhere to recesses on the surface of the rotary polygon mirror. An adhesive with a larger specific gravity is used for first balance correction and an adhesive with a smaller specific gravity for second balance correction, whereby more precise balance correction can be achieved.

Specifically, a deflection scanning apparatus comprises a rotation shaft rotatably supported by bearings fixed in a base, a rotor fixed to the shaft, a rotary polygon mirror incorporated with the rotor through elastic press means, and a stator fixed to the base, which is driven to rotate by a motor composed of the shaft, the rotor and the stator, in which recesses for setting of balance weight are provided on a plurality of portions apart from each other along the rotation shaft and arranged to extend along each peripheral edge and in which a plurality of balance weights different in specific gravity, each of which is an adhesive with a solid material mixed therein, are used. Also, the balance weight recesses are respectively provided for the balance weights different in specific gravity.

In a further specific example, a rotating body has a concentric recess with the center on the center of the rotating body preliminarily formed on the surface of the rotating body and a plurality of balance weights different in specific gravity are attached to unbalance positions in the recess to remove the rotation unbalance in rotation of the rotating body.

Also, specifically, a deflection scanning apparatus comprises a rotation shaft rotatably supported by bearings fixed in a base, a rotor fixed on the shaft, a rotary polygon mirror incorporated with the rotor through elastic press means, and a stator fixed on the base, which is driven to rotate by a motor composed of the shaft, the rotor and the stator, in which at least one member out of the rotor, the elastic press means and the rotary polygon mirror is provided with a concentric recess portion with the center on the center of the rotation shaft and in which a plurality of balance weights different in specific gravity are attached to the recess portion to remove rotation unbalance in rotation.

As described, the present invention can easily and remarkably reduce the vibration of the rotating body in rotation by separately setting balance weights for relieving the dynamic unbalance of the entire rotating body including the rotary polygon mirror, in the recesses for setting of balance weights provided on the rotor and the rotary polygon mirror apart from each other in the direction of rotation shaft of the rotating body. Further, for example, in case of the rotary polygon mirror, the vibration in rotation of the rotating body can be more easily and more precisely relieved by providing two or more recesses for setting of balance weights.

Specifically, a deflection scanning apparatus comprises a rotation shaft rotatably supported by bearings fixed in a base, a rotor fixed on the shaft, a rotary polygon mirror incorporated with the rotor through elastic press means, and a stator fixed on the base, which is driven to rotate by a motor of the shaft, the rotor and the stator, a plurality of portions apart from each other along the rotation shaft each are provided with a balance weight setting recess arranged to extend along a peripheral edge thereof and in which at least one of said portions has a plurality of recesses for setting of balance weights.

In an example, two of said plurality of portions are the rotor and the rotary polygon mirror, and at least one of them is provided with a plurality of recesses for setting of balance weights.

In another example, two of said plurality of portions are the rotor and the elastic press means, and at least one of them is provided with a plurality of recesses for setting of balance weights.

In another example, two of said plurality of portions are the rotary polygon mirror and the elastic press means, and at least one of them is provided with a plurality of recesses for setting of balance weights.

In a further specific example, a rotating body has a plurality of concentric recesses with the center on the center of the rotating body preliminarily formed on the surface thereof, and a plurality of balance weights are attached to the plurality of recesses to remove rotation unbalance in rotation of the rotating body.

Also, specifically, a deflection scanning apparatus comprises a rotation shaft rotatably supported by bearings fixed in a base, a rotor fixed on the shaft, a rotary polygon mirror incorporated with the rotor through elastic press means, and a stator fixed on the base, which is driven to rotate by a motor of the shaft, the rotor and the stator, in which at least one member out of the rotor, the elastic press means and the rotary polygon mirror is provided with a plurality of concentric recesses with the center on the center of the rotation shaft and in which a plurality of balance weights are attached to the recesses to remove rotation unbalance in rotation.

What is claimed is:

1. A deflection scanning apparatus comprising:
   a rotating member having a deflector for deflecting a light beam, said rotating member having first and second recess portions each for setting a balance weight, said first and second recess portions being spaced along a direction in which a rotational axis of said rotating member extends;
   driving means for rotating said rotating member; and
   a balance weight which is set in at least one of said first and second recess portions.

2. A deflection scanning apparatus according to claim 1, wherein said balance weight is set in both said first and second recess portions.

3. A deflection scanning apparatus according to claim 1, wherein said first and second recess portions are spaced radially of said rotational axis.

4. A deflection scanning apparatus according to claim 1, wherein said first and second recess portions are provided concentrically with respect to a rotational center of said rotating member.

5. A deflection scanning apparatus according to claim 1, wherein said first recess portion comprises an annular groove provided concentrically with respect to a rotational center of said deflector, and said second recess portion comprises an annular groove provided concentrically with respect to a rotational center of a member different from said deflector.

6. A deflection scanning apparatus according to claim 1, wherein said balance weight comprises a plurality of balance weights with different specific gravities.

7. A deflection scanning apparatus according to claim 1, wherein said balance weight comprises an ultraviolet curing adhesive.

8. A scanning optical apparatus comprising:
   a light source;
   a rotating member having a deflector for deflecting a light beam from said light source, said rotating member having first and second recess portions each for setting a balance weight, said first and second recess portions being spaced along a direction in which a rotational axis of said rotating member extends;
   driving means for rotating said rotating member; and
   a balance weight which is set in at least one of said first and second recess portions.

9. A scanning optical apparatus according to claim 8, wherein said balance weight is set in both said first and second recess portions.

10. A scanning optical apparatus according to claim 8, wherein said first and second recess portions are spaced radially of said rotational axis.

11. A scanning optical apparatus according to claim 8, wherein said first recess portions are provided concentrically with respect to a rotational center of said rotating member.

12. A scanning optical apparatus according to claim 8, wherein said first recess portion comprises an annular groove provided concentrically with respect to a rotational center of said deflector, and said second recess portion comprises an annular groove provided concentrically with respect to a rotational center of a member different from said deflector.

13. A scanning optical apparatus according to claim 8, wherein said balance weight comprises a plurality of balance weights with different specific gravities.

14. A scanning optical apparatus according to claim 8, wherein said balance weight comprises an ultraviolet curing adhesive.

15. A laser beam printer apparatus comprising:
    a light source;
    a recording medium;
    a rotating member having a deflector for deflecting a light beam from said light source toward said recording medium, said rotating member having first and second recess portions each for setting a balance weight, said first and second recess portions being spaced along a direction in which a rotational axis of said rotating member extends;
    driving means for rotating said rotating member; and
    a balance weight which is set in at least one of said first and second recess portions.

16. A laser beam printer apparatus according to claim 15, wherein said balance weight is set in both said first and second recess portions.

17. A laser beam printer apparatus according to claim 15, wherein said first and second recess portions are spaced radially of said rotational axis.

18. A laser beam printer apparatus according to claim 15, wherein said first and second recess portions are provided concentrically with respect to a rotational center of said rotating member.

19. A laser beam printer apparatus according to claim 15, wherein said first recess portion comprises an annular groove provided concentrically with respect to a rotational center of said deflector, and said second recess portion comprises an annular groove provided concentrically with respect to a rotational center of a member different from said deflector.

20. A laser beam printer apparatus according to claim 15, wherein said balance weight comprises a plurality of balance weights with different specific gravities.

21. A laser beam printer apparatus according to claim 15, wherein said balance weight comprises an ultraviolet curing adhesive.

* * * * *

UNITED STATES PATENT AND TRADEMARK OFFICE
CERTIFICATE OF CORRECTION

PATENT NO. : 5,903,300

DATED : May 11, 1999

INVENTOR(S) : Suzuki

Page 1 of 3

It is certified that error appears in the above-identified patent and that said Letters Patent is hereby corrected as shown below:

In the Drawings:
SHEET 1, FIGURE 1:

Replace Figure 1 with the following:

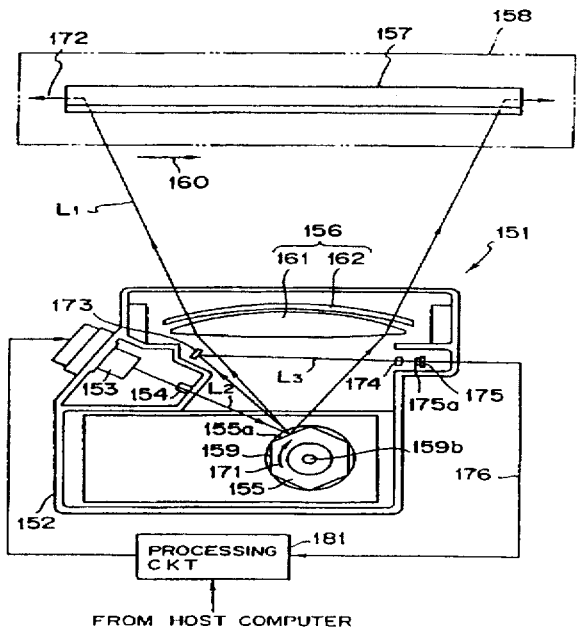

FIG. 1
PRIOR ART

UNITED STATES PATENT AND TRADEMARK OFFICE
CERTIFICATE OF CORRECTION

PATENT NO.  : 5,903,300

DATED       : May 11, 1999

INVENTOR(S) : Suzuki

Figure 2:
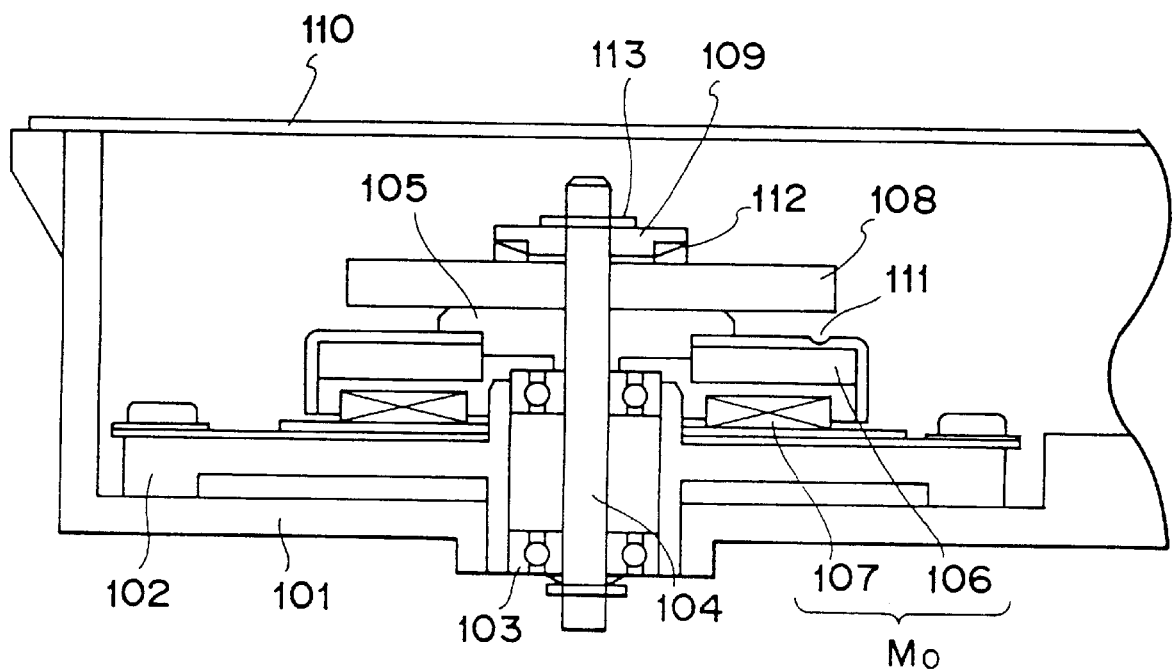
FIG. 2 is a drawing to illustrate the structure of a rotary polygon mirror and its driving portion in a conventional deflection scanning apparatus.

It is certified that error appears in the above-identified patent and that said Letters Patent is hereby corrected as shown below:

SHEET 2, FIGURE 2:

Replace Figure 2 with the following:

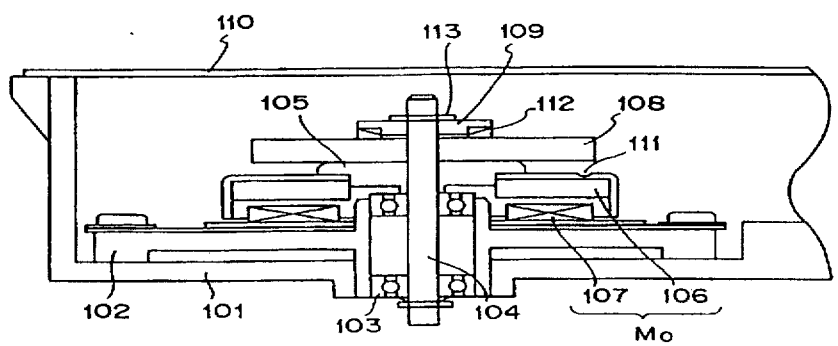

FIG. 2
PRIOR ART

UNITED STATES PATENT AND TRADEMARK OFFICE
CERTIFICATE OF CORRECTION

PATENT NO. : 5,903,300

DATED : May 11, 1999

INVENTOR(S) : Suzuki

It is certified that error appears in the above-identified patent and that said Letters Patent is hereby corrected as shown below:

On the title page, item
[56] REFERENCES CITED:

FOREIGN PATENT DOCUMENTS, "2 189 510" should read --2-189510--.

COLUMN 1:

Line 4, "continuation" should read --division--.
Line 67, "speed of" should read --speed of the--.

COLUMN 6:

Line 29, "Mirror" should read --mirror--.

Signed and Sealed this

Twenty-ninth Day of February, 2000

*Attest:*

Q. TODD DICKINSON

*Attesting Officer*  *Commissioner of Patents and Trademarks*